United States Patent
Jarman-Smith

(10) Patent No.: US 8,829,096 B2
(45) Date of Patent: Sep. 9, 2014

(54) POLYMERIC MATERIALS

(71) Applicant: Invibio Limited, Lancashire (GB)

(72) Inventor: Marcus Jarman-Smith, Lancashire (GB)

(73) Assignee: Invibio Limited, Lancashire (GB)

( * ) Notice: Subject to any disclaimer, the term of this patent is extended or adjusted under 35 U.S.C. 154(b) by 0 days.

(21) Appl. No.: 13/762,964

(22) Filed: Feb. 8, 2013

(65) Prior Publication Data

US 2014/0228497 A1  Aug. 14, 2014

(51) Int. Cl.
C08K 3/32 (2006.01)
C08K 3/10 (2006.01)
C08K 3/40 (2006.01)

(52) U.S. Cl.
CPC ... C08K 3/10 (2013.01); C08K 3/40 (2013.01); C08K 3/32 (2013.01)
USPC .......................................... 524/417; 524/423

(58) Field of Classification Search
USPC ................................. 524/417, 423
See application file for complete search history.

(56) References Cited

U.S. PATENT DOCUMENTS 5,969,020 A    10/1999  Shalaby et al.
8,349,400 B2 *  1/2013  Ramsey et al. ............... 427/230

FOREIGN PATENT DOCUMENTS

WO    2007/051307 A2    5/2007

* cited by examiner

Primary Examiner — Peter Szekely
(74) Attorney, Agent, or Firm — Hodgson Russ LLP

(57) ABSTRACT

An upright column is packed with particles of a first material so the particles touch one another and a network of voids is defined between the particles. The network will be substantially continuous. A second material is then introduced into the column so the second material penetrates the network and fills the voids. The mixture of first and second materials is then consolidated using heat to melt the first or second material, while the other one of the first or second material remains in a solid state and acts as a space holder. Thereafter, the material which acts as the space holder may be removed thereby to leave a substantially continuous porous network defined by the material which was melted. It is found that, by use of the method, a substantially continuous network of the material which is melted can be formed and that the other material can readily be removed and/or is more easily removed compared to if a mixture of first and second materials was formed prior to packing in a column or mold.

21 Claims, No Drawings

POLYMERIC MATERIALS

FIELD OF THE INVENTION

This invention relates to a polymeric material and particularly, although not exclusively, relates to a material comprising a polymeric material and a filler, for example a fugitive or resorbable material, wherein the filler may be removable in order to define a porous structure defined by the polymeric material. In preferred embodiments, the material defines an osseoconductive polymeric material and/or is suitable for medical use such as for making medical implants or parts thereof. Preferred embodiments relate to materials comprising polyaryletherketones, for example polyetheretherketone (PEEK).

BACKGROUND OF THE INVENTION

It is well known to make porous medical implants and there are numerous prior art proposals. For example, WO2007/051307 discloses porous medical implants made from polyetheretherketone and salt (e.g. sodium chloride) in a process wherein the ingredients are placed in a mould cavity, compressed and heated to melt the polyetheretherketone but not the salt and form a moulded part. After subsequent cooling to solidify the mixture, the moulded material is placed in a water bath at 100° C. to dissolve the salt from the moulded part and define a porous moulded part.

U.S. Pat. No. 5,969,020 discloses microporous polymeric foams and microtextured surfaces suitable for medical applications. In preparing the foams, an organic crystalline polymer is melted and combined with a selected solid crystalline fugitive compound to produce a substantially isotropic solution. The solution is cooled under controlled conditions, which foster solid-solid phase separation by the simultaneous crystallization of the fugitive compound and the polymer, to produce a foam precursor containing the solidified fugitive compound dispersed through a matrix of the organic polymer. Crystals of fugitive compound are then removed by solvent extraction and/or sublimation, or like process to produce microcellular foams having a continuous, open-cell structure.

In such porous materials, the fugitive material must be completely removed in an appropriate process to ensure the porous material is not contaminated with any potentially toxic agents prior to implantation. Complete removal can be difficult and, accordingly, there is a risk that levels of fugitive material may remain even after (attempted) removal.

In porous materials for medical implants, it is desirable to define a substantially fully interconnected network of voids, firstly to facilitate complete removal of a fugitive materials used in the preparation of the porous material and, secondly, to define a highly osseoconductive material.

SUMMARY OF THE INVENTION

It is an object of the present invention to address the above-described problems. According to a first aspect of the invention, there is provided a method of making a material, the method comprising:
(a) selecting a receptacle which contains a mass which defines a network of voids, said mass comprising a first component;
(b) introducing a second component into the receptacle so that the second component percolates the network and enters the voids, thereby to produce a material which comprises said first and second components.

One of said first or second components may comprise, preferably consist essentially of, a polymeric material. Thus, said material made in the method preferably comprises a polymeric material.

Said polymeric material preferably comprises a bio-compatible polymeric material. Said polymeric material preferably comprises a thermoplastic polymer.

Said polymeric material may have a Notched Izod Impact Strength (specimen 80 mm×10 mm×4 mm with a cut 0.25 mm notch (Type A), tested at 23° C., in accordance with ISO180) of at least 4 KJm$^{-2}$, preferably at least 5 KJm$^{-2}$, more preferably at least 6 KJm$^{-2}$. Said Notched Izod Impact Strength, measured as aforesaid, may be less than 10 KJm$^{-2}$, suitably less than 8 KJm$^{-2}$.

The Notched Izod Impact Strength, measured as aforesaid, may be at least 3 KJm$^{-2}$, suitably at least 4 KJm$^{-2}$, preferably at least 5 KJm$^{-2}$. Said impact strength may be less than 50 KJm$^{-2}$, suitably less than 30 KJm$^{-2}$.

Said polymeric material suitably has a melt viscosity (MV) of at least 0.06 kNsm$^{-2}$, preferably has a MV of at least 0.09 kNsm$^{-2}$, more preferably at least 0.12 kNsm$^{-2}$, especially at least 0.15 kNsm$^{-2}$.

MV is suitably measured using capillary rheometry operating at 400° C. at a shear rate of 1000 s$^{-1}$ using a tungsten carbide die, 0.5 mm×3.175 mm.

Said polymeric material may have a MV of less than 1.00 kNsm$^{-2}$, preferably less than 0.5 kNsm-2.

Said polymeric material may have a MV in the range 0.09 to 0.5 kNsm$^{-2}$, preferably in the range 0.14 to 0.5 kNsm$^{-2}$, more preferably in the range 0.14 to 0.5 kNsm$^{-2}$.

Said polymeric material may have a tensile strength, measured in accordance with ISO527 (specimen type 1b) tested at 23° C. at a rate of 50 mm/minute of at least 20 MPa, preferably at least 60 MPa, more preferably at least 80 MPa. The tensile strength is preferably in the range 80-110 MPa, more preferably in the range 80-100 MPa.

Said polymeric material may have a flexural strength, measured in accordance with ISO178 (80 mm×10 mm×4 mm specimen, tested in three-point-bend at 23° C. at a rate of 2 mm/minute) of at least 50 MPa, preferably at least 100 MPa, more preferably at least 145 MPa. The flexural strength is preferably in the range 145-180 MPa, more preferably in the range 145-164 MPa.

Said polymeric material may have a flexural modulus, measured in accordance with ISO178 (80 mm×10 mm×4 mm specimen, tested in three-point-bend at 23° C. at a rate of 2 mm/minute) of at least 1 GPa, suitably at least 2 GPa, preferably at least 3 GPa, more preferably at least 3.5 GPa. The flexural modulus is preferably in the range 3.5-4.5 GPa, more preferably in the range 3.5-4.1 GPa.

Said polymeric material may be amorphous or semi-crystalline. It is preferably crystallisable. It is preferably semi-crystalline.

The level and extent of crystallinity in a polymer is preferably measured by wide angle X-ray diffraction (also referred to as Wide Angle X-ray Scattering or WAXS), for example as described by Blundell and Osborn (Polymer 24, 953, 1983). Alternatively, crystallinity may be assessed by Differential Scanning calorimetry (DSC).

The level of crystallinity of said polymeric material may be at least 1%, suitably at least 3%, preferably at least 5% and more preferably at least 10%. In especially preferred embodiments, the crystallinity may be greater than 25%. It may be less than 50% or less than 40%.

The main peak of the melting endotherm (Tm) of said polymeric material (if crystalline) may be at least 300° C.

Said polymeric material may include a repeat unit of general formula

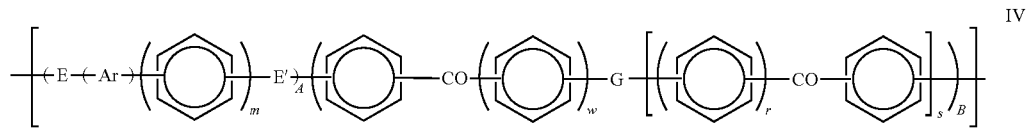

or a repeat unit of general formula

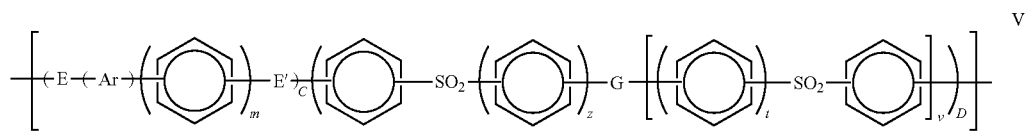

wherein A, B, C and D independently represent 0 or 1, provided at least one of A or B represents 1 and at least one of C or D represents 1, E and E' independently represent an oxygen or a sulphur atom or a direct link, G represents an oxygen or sulphur atom, a direct link or a —O-Ph-β-moiety where Ph represents a phenyl group, m, r, s, t, v, w, and z represent zero or 1 and Ar is selected from one of the following moieties (i) to (v) which is bonded via one or more of its phenyl moieties to adjacent moieties

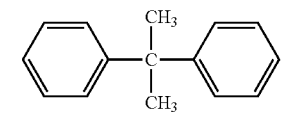 (i)

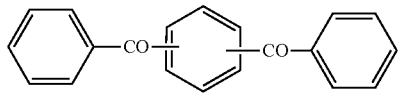 (ii)

-continued

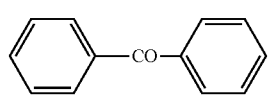 (iii)

 (iv)

 (v)

Preferably A and B represent 1. Preferably C and D represent 1.

Unless otherwise stated in this specification, a phenyl moiety has 1,4-, linkages to moieties to which it is bonded.

Said polymeric material may be a homopolymer which includes a repeat unit of IV or V or may be a random or block copolymer of at least two different units of IV and/or V.

As an alternative to a polymeric material comprising units IV and/or V discussed above, said polymeric material may include a repeat unit of general formula

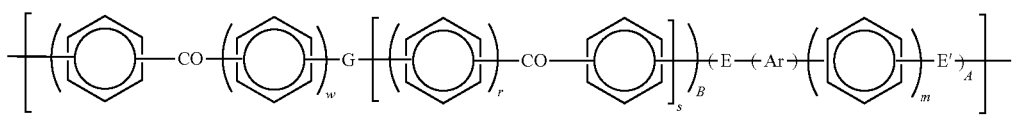

or a homopolymer having a repeat unit of general formula

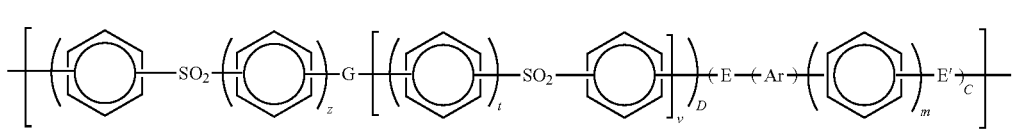

wherein A, B, C, and D independently represent 0 or 1, provided at least one of A or B represents 1 and at least one of C or D represents 1, and E, E', G, Ar, m, r, s, t, v, w and z are as described in any statement herein. Preferably, in IV* and V*, A and B represent 1; and C and D represent 1.

Said polymeric material may be a homopolymer which includes a repeat unit of IV* or V* or a random or block copolymer of at least two different units of IV* and/or V*.

Preferably, said polymeric material is a homopolymer having a repeat unit of general formula IV.

Preferably Ar is selected from the following moieties (vi) to (x)

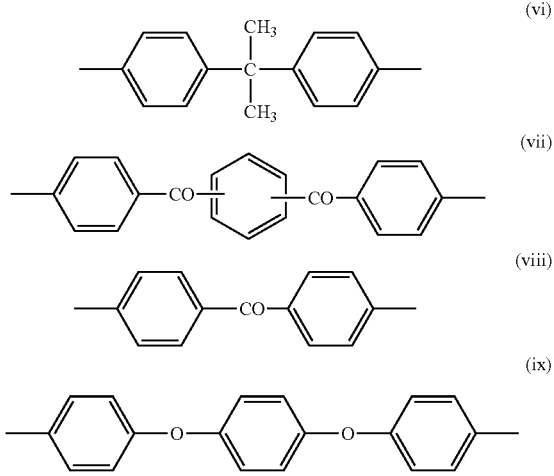

-continued

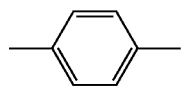

In (vii), the middle phenyl may be 1,4- or 1,3-substituted. It is preferably 1,4-substituted.

Suitable moieties Ar are moieties (ii), (iii), (iv) and (v) and, of these, moieties, (ii), (iii) and (v) are preferred. Other preferred moieties Ar are moieties (vii), (viii), (ix) and (x) and, of these, moieties (vii), (viii) and (x) are especially preferred.

An especially preferred class of polymeric materials are polymers (or copolymers) which consist essentially of phenyl moieties in conjunction with ketone and/or ether moieties. That is, in the preferred class, the polymer material does not include repeat units which include —S—, —SO$_2$— or aromatic groups other than phenyl. Preferred bio-compatible polymeric materials of the type described include:

(a) a polymer consisting essentially of units of formula IV wherein Ar represents moiety (v), E and E' represent oxygen atoms, m represents 0, w represents 1, G represents a direct link, s represents 0, and A and B represent 1 (i.e. polyetheretherketone).

(b) a polymer consisting essentially of units of formula IV wherein E represents an oxygen atom, E' represents a direct link, Ar represents a moiety of structure (ii), m represents 0, A represents 1, B represents 0 (i.e. polyetherketone);

(c) a polymer consisting essentially of units of formula IV wherein E represents an oxygen atom, Ar represents moiety (ii), m represents 0, E' represents a direct link, A represents 1, B represents 0, (i.e. polyetherketoneketone).

(d) a polymer consisting essentially of units of formula IV wherein Ar represents moiety (ii), E and E' represent oxygen atoms, G represents a direct link, m represents 0, w represents 1, r represents 0, s represents 1 and A and B represent 1. (i.e. polyetherketoneetherketoneketone).

(e) a polymer consisting essentially of units of formula IV, wherein Ar represents moiety (v), E and E' represents oxygen atoms, G represents a direct link, m represents 0, w represents 0, s, r, A and B represent 1 (i.e. polyetheretherketoneketone).

(f) a polymer comprising units of formula IV, wherein Ar represents moiety (v), E and E' represent oxygen atoms, m represents 1, w represents 1, A represents 1, B represents 1, r and s represent 0 and G represents a direct link (i.e. polyether-diphenyl-ether-phenyl-ketone-phenyl-).

Said polymeric material may consist essentially of one of units (a) to (f) defined above. Alternatively, said polymeric material may comprise a copolymer comprising at least two units selected from (a) to (f) defined above. Preferred copolymers include units (a). For example, a copolymer may comprise units (a) and (f); or may comprise units (a) and (e).

Said polymeric material preferably comprises, more preferably consists essentially of, a repeat unit of formula (XX)

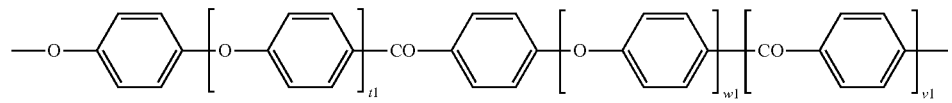

where t1, and w1 independently represent 0 or 1 and v1 represents 0, 1 or 2. Preferred polymeric materials have a said repeat unit wherein t1=1, v1=0 and w1=0; t1=0, v1=0 and w1=0; t1=0, w1=1, v1=2; or t1=0, v1=1 and w1=0. More preferred have t1=1, v1=0 and w1=0; or t1=0, v1=0 and w1=0. The most preferred has t1=1, v1=0 and w1=0.

In preferred embodiments, said polymeric material is selected from polyetheretherketone, polyetherketone, polyetherketoneetherketoneketone and polyetherketoneketone. In a more preferred embodiment, said polymeric material is selected from polyetherketone and polyetheretherketone. In an especially preferred embodiment, said polymeric material is polyetheretherketone.

One of said first or second components preferably consists essentially of said polymeric material and, more preferably, consists essentially of polyetheretherketone.

The other one of said first or second components preferably comprises a fugitive or resorbable material. Said material preferably has a higher melting point (suitably by at least 50° C., preferably at least 100° C., more preferably by at least 200° C., especially by at least 300° C.) than the polymeric material with which it is associated in the method.

Said fugitive or resorbable material may have a melting point of at least 450° C., preferably at least 500° C., more preferably at least 600° C., especially at least 700° C.

The other one of said first or second components may be selected from a salt, apatite, phosphate, sulphate, bioactive glass, controlled release glass and a glass ceramic. Where said component is a salt, it may comprise a water soluble salt. It may comprise an alkaline or alkaline earth metal salt, for example a halide, especially sodium chloride.

When said component is an apatite, it may comprise a hydroxyapatite.

Where said component comprises a phosphate, the phosphate may be resorbable. It may comprise a phosphate mineral. Preferred phosphates include apatites (especially hydroxyapatites) and calcium-containing phosphates, for example a tri-calcium phosphate.

A sulphate may be a calcium-containing sulphate, for example calcium sulphate.

Preferred bioactive glasses include greater than 50 mole % of $SiO_2$, less than 10 mole % CaO and less than 35 mole % of $Na_2O$. They are preferably resorbable.

An especially preferred bioactive glass includes less than 20 mole % sodium oxide and/or is water soluble.

Said bioactive glass suitably includes a glass former and a glass modifier. A glass former may be selected from silicon dioxide, phosphorous pentoxide or boron trioxide. Said glass former preferably comprises silicon dioxide or phosphorous pentoxide. Said bioactive glass suitably includes 85 mole % or less, preferably 75 mole % or less of a said glass former. A glass modifier may be an oxide or carbonate, for example a metal oxide or carbonate or a lanthanide oxide or carbonate. A metal of said oxide or carbonate may be an alkali or alkaline earth metal. Said bioactive glass preferably includes a glass modifier selected from $Li_2O$, $Na_2O$, $K_2O$, MgO, ZnO and CaO. The sum of the amount of glass formers and glass modifiers in said bioactive glass may be at least 80 mole %, preferably at least 90 mole %, more preferably at least 95 mole %. Said bioactive glass may include other compounds in addition to said glass former and glass modifier. Less than 20 mole %, preferably less than 10 mole %, more preferably less than 5 mole % of other compounds may be included.

A bioactive glass as described is suitably able to elicit a reaction when implanted in a human body. For example, being "bioactive" may imply chemical formation of a calcium phosphate layer (amorphous, partially crystalline or crystalline) via ion exchange between surrounding fluid in vitro and the ceramic material. In vitro assessment of whether a said ceramic material is bioactive may be undertaken as described by Kokubo at Biomaterials (2006) 27:2907-2915

Said bioactive glass may include less than 15 mole % sodium oxide, suitably less than 13 mole % sodium oxide, preferably less than 10 mole % sodium oxide, more preferably less than 7 mole % sodium oxide, especially less than 3 mole % sodium oxide. In some cases, said bioactive glass may include less than 1 mole % sodium oxide, preferably 0 mole % of sodium oxide.

The total amount of alkali metal oxide in said bioactive glass may be less than 15 mole %, suitably less than 13 mole %, preferably less than 10 mole %, more preferably less than 7 mole %, especially less than 3 mole %. In some cases, the total amount may be less than 1 mole % and is preferably 0 mole %.

A bioactive glass as described may include silicon dioxide as a glass former. It may include at least 10 mole %, suitably at least 20 mole %, preferably at least 30 mole %, more preferably at least 40 mole % of silicon dioxide. The amount of silicon dioxide may be less than 70 mole %, suitably less than 60 mole %.

A said bioactive glass which includes a high level of silicon dioxide may be insoluble in water or have low solubility.

Properties of bio-active glasses may be dependent on the network connectivity, see Journal of Materials Science Material in Medicine 10 (1999) 697-701 (Wallace) and Journal of Materials Science Letters 15 (1996) 1122-1125 (Hill). Said bio-active glass may have a network connectivity of 2 or greater, preferably greater than 2.1. The network connectivity may be less than 3.2, preferably less than 2.5. The cross-link density as discussed in the aforementioned Hill paper may be greater than −0.10, preferably greater than 0. The cross-link density may be less than 0.8.

Controlled release glasses could also be bioactive but need not be. Controlled release glasses are preferably biocompatible and/or biologically inert. A said controlled release glass suitably includes less than 20 mole %, preferably less than 10 mole %, more preferably less than 5 mole %, especially less than 1 mole % of silicon dioxide. A said controlled release glass may include phosphorous pentoxide as a glass former. It may include at least 10 mole %, preferably at least 20 mole %, more preferably at least 25 mole %, especially at least 30 mole % of phosphorous pentoxide. The amount of phosphorous pentoxide may be less than 85 mole % or less than 60 mole %. A said controlled release glass suitably includes less than 15 mole %, suitably less than 13 mole %, preferably less than 10 mole %, more preferably less than 7 mole %, especially less than 5 mole % of sodium oxide. The total amount of alkali metal oxide in said controlled release glass is suitably less than 15 mole %, suitably less than 13 mole %, preferably less than 10 mole %, more preferably less than 7 mole %, especially less than 5 mole % of alkali metal oxide.

Said controlled release glass may include an alkaline earth metal oxide or carbonate or oxide or carbonate of a lanthanide. The total amount of such oxides or carbonates in said glass may be less than 80 mole %, preferably less than 75 mole %, more preferably less than 70 mole %, especially less than 60 mole %. The total amount of such oxides or carbonates in said glass may be at least 5 mole %, preferably at least 15 mole %, more preferably at least 25 mole %. The total amount of such oxides or carbonates in said glass may be up to 40 mole %.

Said controlled release glass is preferably completely soluble in water at 38° C. On dissolution (in isolation), said controlled release glass suitably has a pH of less than 7, suitably less than 6.8, preferably less than 6.5, more preferably less than 6.

Said mass which defines a network of voids referred to in step (a) may comprise particles (e.g. of a powder) which contact one another within the receptacle, wherein voids are defined between the particles. Prior to step (b), the particles may contact but may not be adhered or fused together. In an alternative embodiment, the mass selected in step (a) may comprise a scaffold which may be defined by members, for example filaments, of said first component. Said members may overlie one another for example to define a grid-like scaffold or lattice, wherein gaps are defined between the members. In this case, therefore, the mass selected in step (a) may comprise a pre-formed structure in which openings or voids are defined.

The voids defined in the mass selected in step (a) may be such that particles having a maximum dimension of less than 300 μm or less than 200 μm or less than 100 μm are able to pass through.

Said first component may have a D50 of 100 μm to 1000 μm, suitably 200 μm to 800 μm, preferably 300 μm to 700 μm, especially 400 μm to 600 μm.

Said second component may have a D50 less than that of said first component. The D50 may be less than 200 μm, less than 150 μm or less than 100 μm.

The ratio of the D50 of the first component divided by the D50 of the second component may be at least 3, at least 4 or at least 5; it may be less than 10, 8 or 6.

As used herein, a "D50 particle size" is the median diameter, where 50% of the volume is composed of particles larger than the stated D50 value, and 50% of the volume is composed of particles smaller than the stated D50 value. As used herein, the median particle size is the same as the D50 particle size. Particle sizes are suitably measured by laser diffraction.

The mass in said receptacle selected in step (a) preferably includes less than 5 wt %, less than 4 wt %, less than 3 wt %, less than 2 wt %, less than 1 wt % of a solvent (e.g. water) or other liquid, measured at the temperature of the mass just prior to introduction of said second component in step (b).

In step (b), an inputted material which comprises said second component is introduced into the receptacle. In one embodiment, the inputted material may comprise said second component dispersed in a solvent; in another embodiment, said inputted material may consist essentially of a mass of solid material which suitably includes at least 90 wt %, preferably at least 95 wt %, more preferably at least 99 wt % of said second component. Said inputted material preferably includes particles suitably of said second component, which are suitably sized to pass through said network of voids defined by said mass comprising said first component.

Said inputted material is suitably introduced into the mass so that the network of voids is substantially filled with solid material which comprises, preferably consists essentially of, said second component.

Where the method involves the inputted material comprising a solvent, the receptacle may include means (e.g. a frit at a lower end thereof) for allowing the solvent to pass out of the receptacle whilst leaving the second component in the receptacle within the network of voids. When said inputted material consists essentially of solid material, means may be provided for preventing said second components passing through and out of the receptacle.

After step (b), less than 15%, less than 10% or less than 5% of the volume of said mass of materials in the receptacle comprises voids. Thus, preferably at least 85%, at least 90% or at least 95% of the volume of the material in the receptacle is defined by solid material.

In step (b), the inputted material may be introduced in a molten state and/or under pressure. Alternatively, the inputted material may be introduced towards an upper end of the receptacle and vibratory movement applied to the receptacle to encourage the inputted material to move through the mass, for example under gravity.

In one embodiment, the first component may comprise a said fugitive and/or resorbable material as described herein and said second component preferably comprises, or consists essentially, of a said polymeric material. Advantageously, by providing the fugitive and/or resorbable material in the receptacle selected in step (a), it may be easier to control porosity and/or interconnectivity in the material produced. In another embodiment, where the first component comprises said polymeric material, materials may be more easily made with improved strength.

The method may include heating one of said first or second components above its melting point. Preferably, the other one of said components is heated to a temperature below its melting point. It is preferred that the polymeric material used in the method is heated above its melting point. In one embodiment, said method includes a step (c), after step (b), wherein said first and second components are heated so that the polymeric material melts whilst the other component remains in a solid state. In another embodiment, the second component may be introduced into the receptacle in step (b) with the second component in a molten state. It may be forced under pressure into voids defined by the first component.

The method preferably includes the step of allowing the receptacle to cool (or actively cooling it) so that the polymeric material solidifies.

After step (b), said material suitably includes at least 20 wt %, preferably at least 30 wt %, more preferably at least 40 wt %, especially at least 45 wt % of said first component. Said material may include less than 70 wt %, or less than 60 wt %, of said first component.

After step (b), said material suitably includes at least 20 wt %, preferably at least 30 wt %, more preferably at least 40 wt %, especially at least 45 wt % of said second component. Said material may include less than 70 wt %, or less than 60 wt % of said second component.

After step (b), said material suitably includes 40-60 wt % of said first component and 40-60 wt % of said second component.

The method may include a step (a*), prior to step (a), which comprises introducing said first component into said receptacle so that it defines said network of voids. Said first component may be in a solid form immediately prior to its introduction into said receptacle. The method may include applying vibratory movement to the receptacle to facilitate packing of said first component in the receptacle.

The method may include a step after step (b) of removal of the material comprising the first and second components from the receptacle. The material is preferably removed in the form of a single solid mass which comprises the first and second components. Said first and second components define a substantially homogenous mass. Suitable the first and second components are in solid form and are preferably substantially immovably arranged within the mass.

The method may include a further step of changing the shape or size of the material removed after step (b), for example by machining, in order to form the material into a part for subsequent use.

The method may include a dissolution step after step (b) which comprises removing, suitably by dissolution using a solvent, fugitive or resorbable (preferably fugitive) material from said material. The solvent used may be aqueous and suitably includes greater than 80 wt %, greater than 90 wt % or greater than 95 wt % water. Preferably, substantially all fugitive or resorbable material is removed thereby to leave porous polymeric material.

The material removed from the receptacle may be used after optional shaping or sizing (e.g. machining) in non-medical or medical applications. It may define a part or the whole of a device which may be incorporated into or associated with a human body. Thus, it may suitably be a part of or the whole of a medical implant. The medical implant may be arranged to replace or supplement soft or hard tissue. It may replace or supplement bone. It may be used in addressing trauma injury or craniomaxillofacial injury. It may be used in joint replacement, for example as part of a hip or finger joint replacement; or in spinal surgery.

In an especially preferred embodiment, said material made in the method includes at least 40% wt, preferably at least 45 wt %, more preferably at least 50 wt % of polyetheretherketone. When material has been subjected to a dissolution step, said material may comprise at least 95 wt % or preferably consist essentially of porous polyetheretherketone.

Said receptacle may comprise a mould, for example, defining at least in part, a medical implant or part thereof. The mould preferably includes an internal wall or walls which contact(s) the first component (and preferably to some extent the second component) in the method. Preferably, the material made in the method is disengaged from the wall or walls at the end of the method, thereby to separate the material made in the method from the mould. The mould preferably includes a substantially smooth wall or walls which the material abuts in the method, prior to removal from the mould. The mould may be any desired shape and/or may be designed to define at least part of the shape of a medical implant or part thereof that may be made in the method.

In one embodiment, the first component (e.g. a fugitive or resorbable material, especially sodium chloride) may comprise substantially spherical particles which are used with particles of a said second component (which preferably comprises polyetheretherketone). The spherical filler (e.g. of sodium chloride) may be made as described in Journal of Alloys and Compounds 499 (2010) 43-47 or as described in Biomaterials 25 (2004) 4955-4962.

In one embodiment, a mould used in the method may be modified by inclusion of a grid (or the like) associated with a lower internal wall of the mould. The grid is intended to provide a means whereby grains (e.g. spherical grains) of first component can be spaced from other grains in the same row, so that the first component is less tightly packed in the mould. The first component (e.g. comprising spherical grains of sodium chloride) may be sintered to set the shape of the filler material and subsequently polymeric material may be introduced into the sintered first component to define a mixture. After heating to melt the polymeric material, the first component may be dissolved to leave a structure defined by the polymeric material which is more open.

According to a second aspect of the invention, there is provided a material made in a method according to the first aspect.

According to a third aspect, there is provided a method of making a medical implant or part of a medical implant for implantation in a human body, the method using a material made as described according to the first aspect.

In one embodiment, the method may include the step of removing the fugitive or resorbable material in order to define the medical implant or part thereof. In another embodiment, a medical implant or part thereof which incorporates the fugitive or resorbable material may be used as medical implant. In this case, the fugitive or resorbable material may be arranged to leach out of the medical implant or part thereof in vivo.

The invention extends to a medical implant or part thereof for use in the human body.

Any feature of any aspect of any invention or embodiment described herein may be combined with any feature of any aspect of any invention or embodiment described herein mutatis mutandis.

DETAILED DESCRIPTION OF THE INVENTION

Specific embodiments of the invention will now be described, by way of example.

The following materials are referred to hereinafter

PEEK micropellets—refer to cylindrical particles of PEEK having a diameter of approximately 600 μm and 600 μm in length. The pellets may be based on PEEK Optima LT1 or LT2 (MV 0.45 kNsm$^{-2}$ and 0.38 kNsm$^{-2}$).

Tricalcium phosphate particles were obtained from PlasmaBioTal UK.

In general terms, an upright column is packed with particles of a first material so the particles touch one another and a network of voids is defined between the particles. The network will be substantially continuous. A second material is then introduced into the column so the second material penetrates the network and fills the voids. The mixture of first and second materials is then consolidated using heat to melt the first or second material, whilst the other one of the first or second material remains in a solid state and acts as a space holder. Thereafter, the material which acts as the space holder may be removed thereby to leave a substantially continuous porous network defined by the material which was melted. It is found that, by use of the method, a substantially continuous network of the material which is melted can be formed and that the other material can readily be removed and/or is more easily removed compared to if a mixture of first and second materials was formed prior to packing in a column or mould.

The following examples describe preferred embodiments:

Example 1

An upright column of 30 mm diameter was packed with spherical sodium chloride particles, made by stirring solid salt particles in hot oil at 80° C. The column was closed at both ends by porous frits, with pores size less than 100 μm. Alternatively, the lower end could be closed by a solid body instead of the frit. 70 μm PEEK powder (Victrex PEEK 450 PF) was placed on top of the upper frit and vibrated (using an AutoTap from QuantaChrome UK) so that the PEEK powder sedimented down into and through the salt bed. The column was then placed in an oven and heated at 400° C. for 45 minutes to melt the polymer and produce a network of interconnected polymer with salt particles in between. Alternative methods of aiding packing of the bed include sintering the bed materials at a temperature near the melting point or by cold compressing the packed bed (e.g. at 250 Newtons).

Example 2

The procedure of Example 1 was followed except that the 70 μm PEEK powder was suspended in ethanol, introduced into the salt bed and allowed to pass into the bed so that the PEEK powder sedimented down throughout the salt bed. The column was heated as described in Example 1.

Example 3

A column of 30 mm diameter was packed with PEEK micro pellets. The bottom of the column was closed by a solid body. Tri calcium phosphate (TCP) powder of 20 μm was placed on top of the PEEK bed and vibrated so that the TCP powder sedimented down through the PEEK bed and backed up, filling the interstitial spaces between the PEEK. The column was heated as described in Example 1.

Example 4

A column of 30 mm diameter was packed with spherical soluble bioglass particles obtained from Mo-Sci. The bottom of the column was closed by a solid body. PEEK powder of 70 μm was placed on top of the bioglass bed and vibrated so that the PEEK powder sedimented down through the bioglass bed, filling the spaces between the bioglass particles. The column materials were then compressed to further pack the mix. The column was then placed in an oven and heated at 400° C. for 45 minutes to melt the polymer. The PEEK/bioglass mass was removed from the column and leached in a boiling water solution for 4 hours to dissolve the bioglass and produce a porous rod.

Example 5

A column of 30 mm diameter was packed with spherical 300 μm Tricalcium phosphate (TCP) particles. The bottom of the column was closed by a solid body. PEEK powder of 70 μm diameter was placed on top of the TCP bed and vibrated so that the PEEK powder sedimented down through the TCP bed until reaching the bottom. The PEEK then backed up in the column, filling the spaces in between the TCP spheres. The column was then placed in an oven and heated at 400° C. for 45 minutes to melt the polymer. The compound was removed from the column and machined to small disk shapes. These could then be used still filled with TCP or the TCP could be removed with solvent to leave a porous PEEK structure.

Example 6

A column of 30 mm diameter was packed with spherical 300 μm Tricalcium phosphate particles. The bottom of the column was closed by a solid body. The column was connected to a heater element and ram extruder. Molten PEEK was then forced through the bed under pressure so that the molten material flowed down through the spaces in between the TCP spheres. It was found that lower viscosity PEEK aided the flow through the bed. The PEEK was allowed to flow out of the base of the column through a 200 μm orifice. After cooling, the compound was removed from the column and machined to small disk shapes. These could then be used, still filled with TCP or the TCP could be removed with a solvent to leave a porous PEEK structure.

In alternative embodiments, a construct may be made having solid and filled areas. For example, a solid (unfilled) PEEK layer may be formed in a column and a PEEK/filler layer formed on the top of the PEEK layer. The filler may be removed to provide a construct comprising a solid PEEK layer and a porous PEEK layer.

In another alternative, instead of the column, a mould may be used which is arranged so that sedimentation of a second material can only take place in selected channels. A rod (or the like) may thereby be formed which may include a central core with an outer filled (or porous) cylindrical region around the core; or a rod (or the like) may be formed with an inner filled (or porous) central core with an outer solid PEEK cylindrical region.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of making a material, the method comprising:
   (a) selecting a receptacle which contains a mass which defines a network of voids, said mass comprising a first component; and
   (b) introducing a second component into the receptacle so that the second component percolates the network and enters the voids, thereby to produce a material which comprises said first and second components,
   wherein the voids in the mass contained in the receptacle in step (a) are defined such that particles having a dimension of 300 μm or less can pass through.

2. A method according to claim 1, wherein one of said first or second components comprises a polymeric material and wherein the other one of said first or second components comprises a fugitive or resorbable material.

3. A method according to claim 2, wherein said polymeric material comprises a repeat unit of formula (XX)

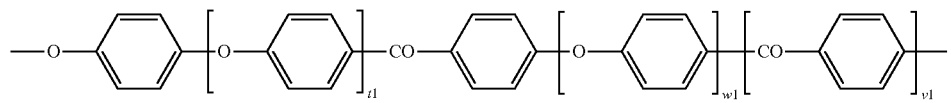

where t1 and w1 independently represent 0 or 1 and v1 represents 0, 1 or 2.

4. A method according to claim 1, wherein said receptacle comprises a mould which defines at least a part of a medical implant or part thereof.

5. A method of making a medical implant or part of a medical implant for implantation in a human body, the method comprising a making a material in a method comprising:
   (a) selecting a receptacle which contains a mass which defines a network of voids, said mass comprising a first component;
   (b) introducing a second component into the receptacle so that the second component percolates the network and enters the voids, thereby to produce a material which comprises said first and second components; and
   (c) removing the material from the receptacle.

6. A method according to claim 5, wherein one of said first or second components comprises a polymeric material and wherein the other one of said first or second components comprises a fugitive or resorbable material.

7. A method according to claim 6, wherein said fugitive or resorbable material has a melting point of at least 450° C.

8. A method according to claim 6, wherein the other one of said first or second components is selected from a salt, apatite, phosphate, sulphate, bioactive glass, controlled release glass and a glass ceramic.

9. A method according to claim 6, the method including a dissolution step after step (b) which comprises removing fugitive or resorbable material from said material.

10. A method according to claim 6, wherein said polymeric material comprises a repeat unit of formula (XX)

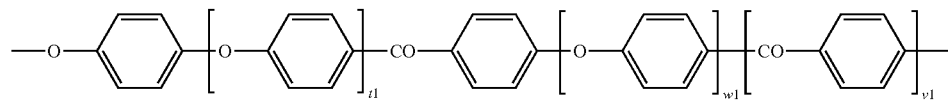

where t1 and w1 independently represent 0 or 1 and v1 represents 0, 1 or 2.

11. A method according to claim 5, wherein said first component has a D50 of 100 μm to 1000 μm; and said second component has a D50 less than that of said first component.

12. A method according to claim 5, which includes a step of changing the shape or size of the material removed from the receptacle after step (b) in order to form the material into a part for subsequent use.

13. A method according to claim 5, wherein said material made in the method includes at least 50 wt % polyetheretherketone.

14. A method of making a material, the method comprising:
   (a) selecting a receptacle which contains a mass which defines a network of voids, said mass comprising a first component;
   (b) introducing a second component into the receptacle so that the second component percolates the network and enters the voids, thereby to produce a material which comprises said first and second components,
   wherein the first component comprises a fugitive and/or resorbable material and said second component comprises a polymeric material.

15. A method according to claim 14, wherein one of said first or second components comprises a polymeric material and wherein the other one of said first or second components comprises a fugitive or resorbable material.

16. A method according to claim 15, wherein said polymeric material comprises a repeat unit of formula (XX)

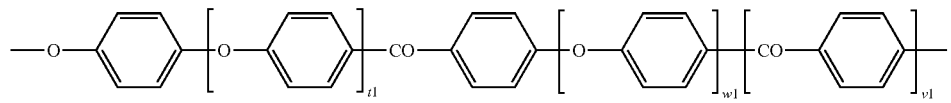

where t1 and w1 independently represent 0 or 1 and v1 represents 0, 1 or 2.

17. A method according to claim 14, wherein said receptacle comprises a mould which defines at least a part of a medical implant or part thereof.

18. A method of making a material, the method comprising:
   (a) selecting a receptacle which contains a mass which defines a network of voids, said mass comprising a first component; and
   (b) introducing a second component into the receptacle so that the second component percolates the network and enters the voids, thereby to produce a material which comprises said first and second components,
wherein said method includes a step (c), after step (b), and wherein said first and second components are heated so that the polymeric material melts whilst the other component remains in a solid state.

19. A method according to claim 18, wherein one of said first or second components comprises a polymeric material and wherein the other one of said first or second components comprises a fugitive or resorbable material.

20. A method according to claim 19, wherein said polymeric material comprises a repeat unit of formula (XX)

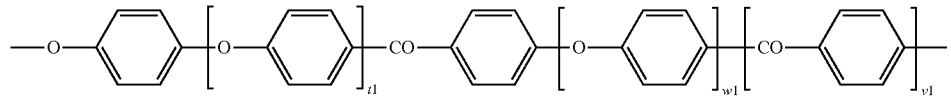

where t1 and w1 independently represent 0 or 1 and v1 represents 0, 1 or 2.

21. A method according to claim 18, wherein said receptacle comprises a mould which defines at least a part of a medical implant or part thereof.

* * * * *